United States Patent [19]

Sugiura et al.

[11] Patent Number: 4,679,074
[45] Date of Patent: Jul. 7, 1987

[54] COLOR IMAGE PROCESSING APPARATUS WITH A PLURALITY OF ADDRESSABLE CHARACTERISTIC CONVERSION TABLES FOR COMPENSATING FOR DIFFERENCES IN THE SPECTRAL CHARACTERISTICS OF DIFFERENT INPUT DEVICES

[75] Inventors: Susumu Sugiura, Yamato; Takashi Sugino, Kawasaki; Naoya Hirose, Yokohama, all of Japan

[73] Assignee: Canon Kabushiki Kaisha, Tokyo, Japan

[21] Appl. No.: 589,464

[22] Filed: Mar. 14, 1984

[30] Foreign Application Priority Data

Mar. 17, 1983 [JP] Japan .................. 58-44988

[51] Int. Cl.⁴ .................. G03F 3/08; H04N 1/46; H04N 5/202; H04N 9/69
[52] U.S. Cl. .................. 358/80; 358/32; 358/75; 358/164; 358/280
[58] Field of Search .................. 358/75, 76, 78, 32, 358/80, 164, 280

[56] References Cited

U.S. PATENT DOCUMENTS

| | | | |
|---|---|---|---|
| 3,622,698 | 11/1971 | Richeson, Jr. et al. | 358/280 |
| 4,032,969 | 6/1977 | Ueda | 358/80 |
| 4,285,009 | 8/1981 | Klopsch | 358/80 |
| 4,349,835 | 9/1982 | Horiguchi et al. | 358/76 |
| 4,364,084 | 12/1982 | Akimoto et al. | 358/76 |
| 4,383,277 | 5/1983 | Kubo | 358/280 |
| 4,622,582 | 11/1986 | Yamada | 358/80 |

FOREIGN PATENT DOCUMENTS

| | | | |
|---|---|---|---|
| 0084228 | 7/1983 | European Pat. Off. | 358/80 |
| 2073987 | 10/1981 | United Kingdom | 358/75 |

*Primary Examiner*—James J. Groody
*Assistant Examiner*—Randall S. Svihla
*Attorney, Agent, or Firm*—Fitzpatrick, Cella, Harper & Scinto

[57] ABSTRACT

There is disclosed an image processing apparatus for processing an image signal in which the mode of image processing is rendered variable to adapt to plural input devices. More specifically, a conversion matrix circuit receives image signals from one of a plurality of different input devices and converts the image signals into corrected additive primary color signals red, green and blue. The conversion matrix circuit compensates for any differences in the spectral characteristics of the different input devices. The matrix includes a plurality of conversion tables stored in memory for performing the conversion. A selected one of the conversion tables is addressed by the image signals.

14 Claims, 5 Drawing Figures

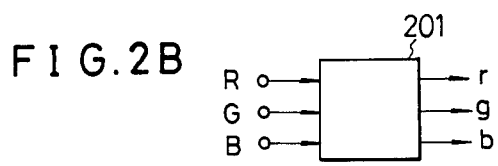
FIG. 2A
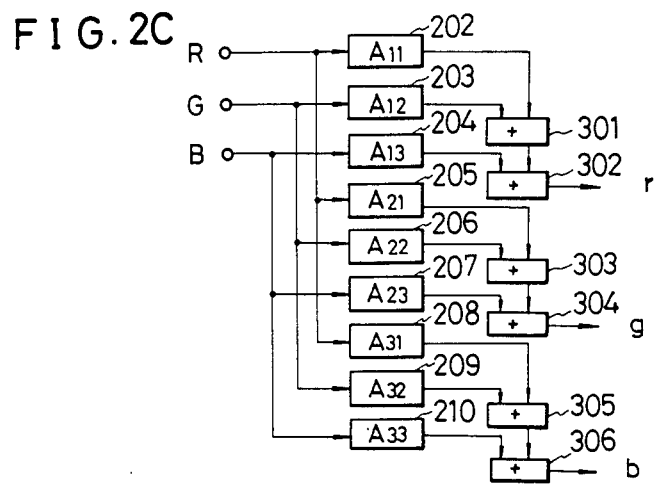
FIG. 2B
FIG. 2C

COLOR IMAGE PROCESSING APPARATUS WITH A PLURALITY OF ADDRESSABLE CHARACTERISTIC CONVERSION TABLES FOR COMPENSATING FOR DIFFERENCES IN THE SPECTRAL CHARACTERISTICS OF DIFFERENT INPUT DEVICES

BACKGROUND OF THE INVENTION

1. Field of the Invention

The present invention relates to an image processing apparatus for processing image data entered from input devices.

2. Description of the Prior Art

There are recently known image forming apparatus for printing color image data entered from input devices, for example, color television cameras, color scanners, or magnetic tapes containing an image data base.

Such image forming apparatus generally has a single input device and is designed to realize faithful color reproduction in consideration of the spectral characteristics of that input device. In the case of printing color image data entered from another input device, such conventional image forming apparatus, lacking means for correcting the spectral characteristic of such different input device, results in a deviation in color in the output print. Thus, different color prints are obtained even from the same original since the spectral characteristics of the color separation filters, conditions of the illuminating light source, spectral characteristics of the photoreceptors, etc., are not standardized. It has been recently desired to print image data supplied from various input devices by means of a single image forming apparatus. It is, difficult however, to standardize the overall spectral characteristics of various input devices, since each input device is generally designed in a form most suitable for an image forming apparatus for which the input device is principally used.

SUMMARY OF THE INVENTION

The principal object of the present invention is to eliminate the drawbacks mentioned above.

Another object of the present invention is to provide an image processing apparatus capable of providing images of high quality from various input devices.

Still another object of the present invention is to provide an image processing apparatus capable of selecting a desired input device.

Still another object of the present invention is to provide an image processing apparatus capable of correcting image data with a limited memory capacity.

Still another object of the present invention is to provide an image processing apparatus capable of providing images of high quality even from different input devices simply by changing parameters of a designated processing circuit.

Still another object of the present invention is to provide an inexpensive image processing apparatus capable of switching input devices.

The foregoing and still other objects of the present invention will become fully apparent from the following description which should be taken in conjunction with the attached drawings, and also from the appended claims.

BRIEF DESCRIPTION OF THE DRAWINGS

FIG. 2A is a chart showing a conversion matrix;

FIG. 2B is a diagram showing a conversion table memory;

FIG. 2C is a diagram showing another embodiment of the conversion matrix in circuit form.

DETAILED DESCRIPTION OF THE PREFERRED EMBODIMENTS

Now the present invention will be explained, in detail, by preferred embodiments thereof shown in the attached drawings.

Figure 1:
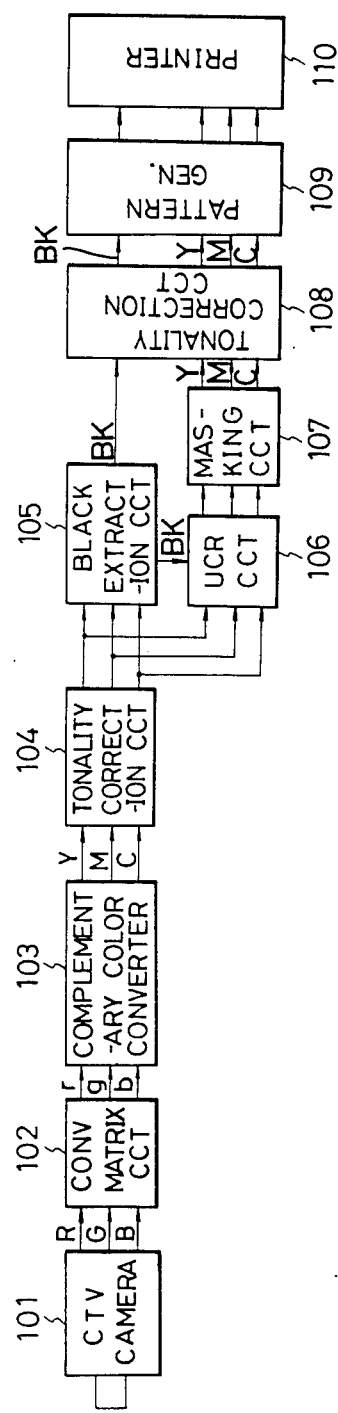
FIG. 1 is a block diagram of a color image processing apparatus to which the present invention is applicable.

FIG. 1 shows a color image forming apparatus in which the present invention is applicable, wherein an input device 101 is composed, in the present embodiment, of a color television camera, which supplies color-separated signals of red (R), green (G) and blue (B) to a conversion matrix circuit 102. The conversion matrix circuit 102 functions as a color correction circuit for correcting the input image data in case the input device 101 has different spectral characteristics from other input devices which may be used with the present invention, i.e., the spectral characteristic of color separation filters, the conditions of the illuminating light source, the spectral characteristic of the photoreceptor (photosensor), etc., and constitutes an interface between the input device and an image processing unit, such as a complementary color converter, etc., to be explained later. The signals R, G, B entered from the input device 101 are converted, by means of said conversion matrix circuit 102, into corrected additive primary color signals, r, g, b, which are further converted, by a complementary color converter 103, into subtractive primary colors of yellow (Y), magenta (M) and cyan (C). A first tonality correction circuit 104 corrects the tonality ($\gamma$) or gamma characteristic of the color television camera 101. Since $\gamma_1 = 0.45$ in an NTSC television camera, the first tonality correction circuit 104 adjusts to $\gamma_2 = 2.2$ so that $\gamma_1 \cdot \gamma_2$ becomes equal to unity. The first tonality correction circuit 104 is provided with a tonality correction table for each color. A black extraction circuit 105 extracts the minimum value of the signals Y, M, C subjected to tonality correction in the first tonality correction circuit 104, thus determining a black signal BK or the amount of black ink. An undercolor removal circuit (UCR) 106 subtracts the amount of black ink, determined by the black extraction circuit, from the tonality-corrected signals supplied from the first tonality correction circuit 104, thus supplying signals of colored components Y, M and C to a masking circuit 107. Also a black signal BK supplied from the black extraction circuit 105 is processed in accordance with known techniques, through various circuits such as a table conversion circuit and a tonality ($\gamma$) correction circuit (not shown) to a second tonality correction circuit 108. Said signal, being an uncolored component, does not go through the masking circuit 107, which performs color correction on the color signals processed in the undercolor removal circuit 106. The second tonality correction circuit 108 corrects the color signals Y, M, C, BK, according to the printing characteristic of a pattern generator 109, for example containing a dither matrix, and a printer 110.

Since the conversion matrix circuit 102 immediately follows the input device in the present embodiment, an adjustment on the conversion matrix circuit 102 for a different input device 101, or for a different spectral characteristic of the image data entered from the input device, enables one to obtain an optimum color image without any change in the parameters from the complementary color converter 103 to the printer. Stated differently, in the present embodiment, the differences in the spectral characteristic among different input devices are compensated in the conversion matrix circuit 102 and do not affect the parameters of the complementary color converter 103 and the ensuing circuits. As an example, when the color television camera employed as the input device 101 is replaced by a color scanner, an adjustment of the conversion matrix circuit 102 alone enables one to obtain an optimum color image, without any change in the complementary color converter 103 and the ensuing circuits.

Now reference is made to FIGS. 2A-2C for explaining the details of the conversion matrix circuit 102. FIG. 2A shows a matrix for converting the spectral characteristics from the (R, G, B) system to the (r, g, b) system. FIG. 2B shows a conversion table memory for realizing the conversion shown in FIG. 2A and is composed of a read-only memory (ROM) or a programmable read-only memor (PROM) which is addressed by the image signals R, G, B themselves. Consequently the conversion table memory 201 needs $2^{12}=4096$ addresses if each image signal R, G or B is of 4 bits. However, if the image signal is of 8 bits, there will be required $2^{24}=16,777,216$ addresses corresponding to excessively costly large memory capacity. In such a case the conversion is achieved by a structure as shown in FIG. 2C, wherein the multiplications in the calculation according to the matrix shown in FIG. 2A are achieved by table converters 202-210 while the additions are achieved by adders 301-306. If any of the coefficients A12, A13, A21, A23, A31 and A32 becomes negative, a complementary number calculator is inserted between the table converter and the adder and provides the obtained result to the adder. The structure shown in FIG. 2C requires $2^8 \times 9 = 2304$ addresses for an image signal of 8 bits and is therefore advantageous from a cost viewpoint. The conversion matrix circuit 102 may contain either the conversion table memory 201 or a circuit as shown in FIG. 2C. More specifically, the conversion matrix circuit 102 may contain correction tables as shown in FIG. 2A in a number corresponding to the species of the connectable input devices. Also, the conversion matrix is not limited to the kind shown in FIG. 2A but may include second-order terms of the signals R, G, B for achieving non-linear conversion of the image data. Thus, the conversion matrix circuit constitutes an interface capable of exactly performing gamma correction, correction of spectral characteristics, etc.

Figure 3:
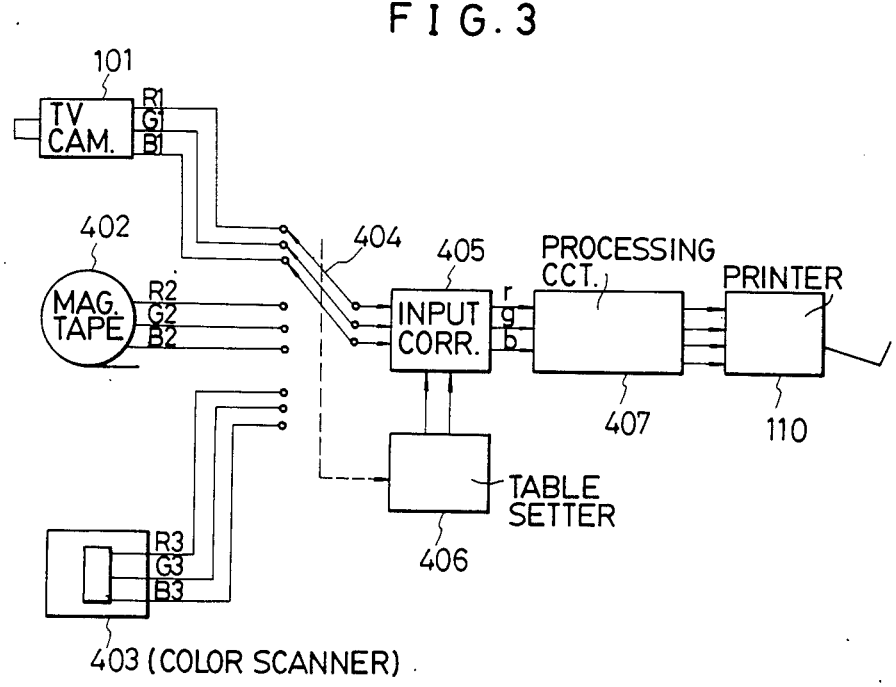
FIG. 3 is a block diagram of an image forming apparatus equipped with a plurality of input devices of different types.

FIG. 3 shows an embodiment of the image forming apparatus equipped with a plurality of input devices of different types, wherein shown are a color television camera 101 having color signals R1, G1 and B1; a magnetic video tape player 402 having color signals R2, G2 and B2; a color scanner 403 having color signals R3, G3 and B3; an input device selector switch 404; an input correction device 405 including the aforementioned conversion matrix circuit 102; a table setter 406 for selecting the correction tables as shown in FIG. 2A corresponding to the selected input device; a processing circuit 407 including the circuit units 103-109 shown in FIG. 1; and a color printer 110.

The input devices 101, 402, 403 are suitably selected by the selector switch 404, and in response to the selection made, the correction tables in the input correction device 405 are selected by the table setter 406, in order to achieve a conversion matching the selected input device since the input devices 101, 402, 403 are different in the spectral characteristics of color separation filters, photoreceptors etc. and therefore provide image data of different properties. The separated signals r, g, b converted in the input correction device are processed in the processing circuit 407 as explained before and recorded as an image in the printer 110.

The table setter 406 can be composed of a keyboard or a selector switch.

The table setter 406 may be linked with the input device selector switch 404 in such a manner that a correction table is automatically selected in response to the selection of an input device, thus avoiding the trouble of selecting the correction table or of resetting the values thereof.

In the present embodiment, the output device is composed of a printer, but a cathode ray tube may be employed for this purpose. The conversion matrix circuit need not be placed in the position shown in FIG. 1 but may be placed in other positions. In such a case, the parameters of the circuits preceding the conversion matrix circuit should be suitably altered simultaneously with the switching of the correction table when the input device is changed.

In the foregoing embodiments the correction of the input image data is achieved by a conversion table memory composed for example of a read-only memory, however the present invention is not limited to such a method and includes corrections by other suitable methods.

As explained in the foregoing, the present invention allows one to select parameters of the processing circuit in response to the selected input device to correct the characteristic of the image data entered from said input device, thus enabling one to obtain an excellent image without distortion in color.

Also, the present invention enables one to provide an inexpensive image processing apparatus capable of providing high image quality, since, in response to the selection of a new input device, adjustment is made only on the conversion matrix circuit, without affecting the parameters of the data processing circuits.

The present invention is not limited to the foregoing embodiments but is subject to various modifications within the scope and spirit of the appended claims.

What we claim is:

1. A color image signal processing apparatus, comprising:
   input means for receiving a color image signal connectable to plural kinds of color input devices, wherein said input devices may have different spectral characteristics;
   conversion means for converting characteristics of the color image signal received by said input means according to one of a plurality of predetermined conversion tables, said one conversion table being addressed by the color image signal received by said input means and outputting a processed color image signal;

switching means for selecting said one conversion table of said conversion means according to the kind of color input device connected to said input means;

output means for receiving the processed color image signal, said output means being common to said plural kinds of input devices; and processing means for receiving the processed color image signal outputted from said one conversion table and providing the processed color image signal to said common output means.

2. A color image signal processing apparatus according to claim 1, wherein each of said conversion tables is adapted to convert the characteristics of the color image signal received by said input means according to a predetermined conversion matrix.

3. A color image signal processing apparatus according to claim 2, wherein said conversion means comprises a memory for storing the conversion tables.

4. A color image signal processing apparatus according to claim 1, wherein said conversion means is adapted to convert the characteristics of said color image signal received by said input means according to said predetermined conversion tables in order to compensate for any differences between the spectral characteristics of the plural kinds of color input devices.

5. A color image signal processing apparatus according to claim 1, wherein said output means is a color printer.

6. A color image signal processing apparatus according to claim 1, wherein said processing means includes a complementary color conversion circuit, a tonality correction circuit and a masking circuit.

7. A color image signal processing apparatus according to claim 1, wherein said plural kinds of color input devices include color image data storing means and color image reading means.

8. A color image signal processing apparatus according to claim 1, wherein said switching means is adapted to select said one of said predetermined conversion tables in accordance with the connection of said color input devices to said input means.

9. A color image data processing apparatus, comprising:

color image data storing means for storing color image data, said storing means being a source for producing first color image data;

color image reading means for reading a color image, said reading means being a source for producing second color image data;

input means for receiving color image data connectable to either said color image data storing means or to said color image reading means;

conversion means for converting characteristics of the color image data received by said input means according to one of a plurality of predetermined conversion tables, said one conversion table being addressed by the color image data received by said input means and outputting processed color image data;

switching means for selecting said one conversion table of said conversion means according to whether the source for producing the color image data is said color image data storing means or said color image reading means, said source being connected to said input means;

an image reproduction means being common to said color image data storing means and to said color image reading means; and processing means for receiving the processed color image data outputted from said one conversion table and providing the processed color image data to said common image reproduction means.

10. A color image signal processing apparatus, comprising:

input means for receiving a color image signal connectable to plural kinds of color input devices, wherein said input devices may have different spectral characteristics;

conversion means for converting characteristics of the color image signal received by said input means according to predetermined conversion parameters and outputting a processed color image signal;

switching means for selecting the conversion parameters of said conversion means according to the kind of color input device connected to said input means, said switching means being adapted to select said conversion parameters in accordance with the connection of said color input devices to said input means;

output means for receiving the processed color image signal, said output means being common to said plural kinds of color input devices; and processing means for receiving the processed color image signal outputted from said conversion means and providing the processed color image signal to said output means.

11. A color image signal processing apparatus according to claim 10, wherein said conversion means comprises a memory which is addressed by the color image signal received by said input means.

12. A color image signal processing apparatus according to claim 10, wherein said conversion means is adapted to convert the characteristics of the color image signal received by said input means according to one of a plurality of predetermined conversion matrices.

13. A color image signal processing apparatus according to claim 12, wherein said conversion means comprises a memory which is addressed by the color image signal received by said input means and operation means for converting the characteristics of the color image signal according to said one predetermined conversion matrix by utilizing outputs from said memory.

14. A color image signal processing apparatus according to claim 10, wherein said conversion means is adapted to convert the characteristics of the color image signal received by said input means according to said predetermined conversion parameters in order to compensate for any differences between the spectral characteristics of said plural kinds of color input devices.

* * * * *

UNITED STATES PATENT AND TRADEMARK OFFICE
CERTIFICATE OF CORRECTION

PATENT NO. : 4,679,074

DATED : July 7, 1987

INVENTOR(S) : SUSUMU SUGIURA, ET AL.

It is certified that error appears in the above-identified patent and that said Letters Patent is hereby corrected as shown below:

COLUMN 1

Line 36, "is, difficult" should read --is difficult--.

COLUMN 4

Line 37, "however the" should read --however, the--.

Signed and Sealed this

Seventeenth Day of November, 1987

Attest:

DONALD J. QUIGG

Attesting Officer

Commissioner of Patents and Trademarks